United States Patent [19]

Schmit

[11] Patent Number: 4,733,706

[45] Date of Patent: Mar. 29, 1988

[54] PNEUMATIC TIRE

[75] Inventor: Georges J. Schmit, Bridel, Luxembourg

[73] Assignee: The Goodyear Tire & Rubber Company, Akron, Ohio

[21] Appl. No.: 900,465

[22] Filed: Aug. 25, 1986

Related U.S. Application Data

[63] Continuation of Ser. No. 607,884, May 7, 1984, abandoned.

[51] Int. Cl.$^4$ .................. B60C 11/06; B60C 9/02; B60C 9/28

[52] U.S. Cl. .................. 152/209 R; 152/209 D; 152/527; 152/538; 152/539; 152/551; 152/556; 152/560

[58] Field of Search .............. 152/551, 554, 556, 558, 152/560, 561, 559, 539, 526, 531, 209 R, 209 D, 209 A, 209 B, 209 WT, 209 NT, 344.1, 527, 450, 538; 244/103 R

[56] References Cited

U.S. PATENT DOCUMENTS

| | | | |
|---|---|---|---|
| 1,732,793 | 10/1929 | Darrow | 152/344.1 |
| 1,818,944 | 8/1931 | Darrow | 152/548 X |
| 3,451,461 | 6/1969 | Wittneben | 152/538 |
| 4,185,675 | 1/1980 | Greiner et al. | 152/560 X |
| 4,387,755 | 6/1983 | Kato et al. | 152/209 R |

FOREIGN PATENT DOCUMENTS

| | | |
|---|---|---|
| 1505108 | 9/1972 | Fed. Rep. of Germany . |
| 2380907 | 2/1977 | France . |

Primary Examiner—Jerome Massie
Assistant Examiner—Thomas Bokan
Attorney, Agent, or Firm—L. R. Drayer

[57] ABSTRACT

A radial ply pneumatic tire has at least two carcass reinforcing layers, each of which comprises two discontinuous plies. Each discontinuous ply is anchored around a single bead core and extends through a sidewall into the crown portion of the tire where it axially overlaps the tread reinforcing belt structure. The two discontinuous plies of each carcass layer are separated by a circumferentially extending gap, and the gaps in each carcass layer are staggered relative to one another as well as relative to the circumferentially extending grooves of the tire's tread pattern.

7 Claims, 1 Drawing Figure

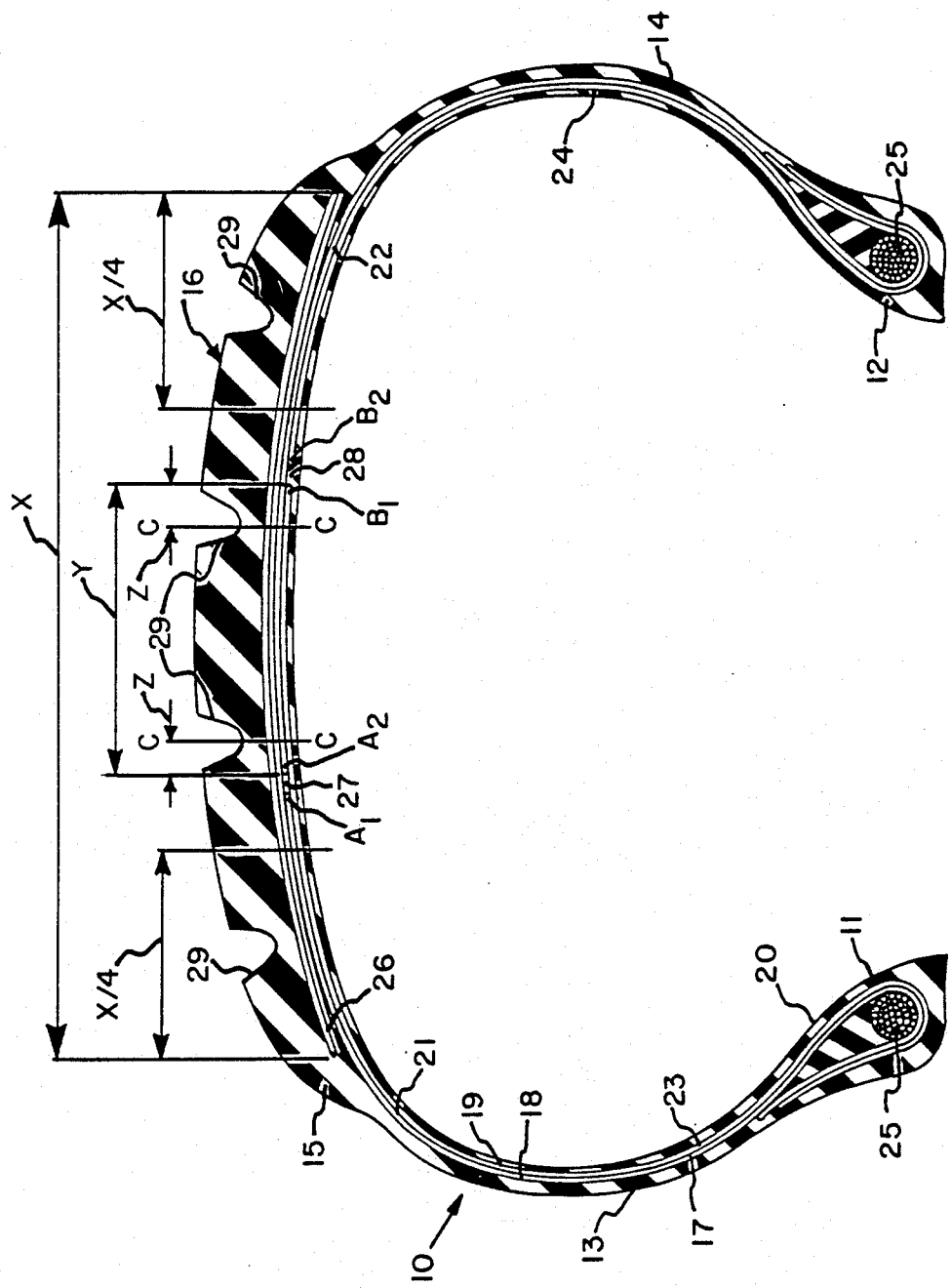

PNEUMATIC TIRE

This is a continuation of application Ser. No. 607,884 filed on May 7, 1984 now abandoned.

BACKGROUND OF THE INVENTION

This invention relates to radical carcass tires, and in particular to radial carcass tires for use on aircraft. It is believed that in radial carcass tires the tension on the carcass reinforcing cords is lower in the crown portion of the tire than in the sidewall portions of the tire. Conventional radial carcass tires have reinforcing plies that extend continuously and uninterrupted from one bead portion of the tire to the other bead portion of the tire. However, it is known to manufacture radial carcass tires having carcass reinforcing layers that comprise a plurality of discontinuous plies. As used herein, a "discontinuous ply" is a ply of reinforcing cords that is anchored around only one bead core of the tire.

In the prior art, for example, FR Pat. No. 2,380,907 and German Pat. No. 1,505,108, describe radial carcass tires in which the carcass reinforcing cords do not extend continuously from one bead portion of the tire to the other bead portion of the tire. In each of these documents, there is illustrated a tire carcass having two layers of reinforcing cords comprising two discontinuous plies each, with each of the discontinuous plies extending from a bead portion of the tire into the crown portion of the tire. In German Pat. No. 1,505,108, the two discontinuous plies overlap causing an irregularity. In French Pat. No. 2,380,907, the two discontinuous plies are axially spaced apart beneath the tread reinforcing belt by a gap having a width in excess of one-half of the axial width of the tread reinforcing belt, thereby necessitating the use of an extra support layer to interconnect the two discontinuous plies of each carcass reinforcing layer.

The present invention provides a radial carcass tire having a carcass comprising two layers of reinforcing cords each of which does not extend continuously from one bead portion of the tire to another, and which does not have the disadvantages of the prior art tires of this type.

SUMMARY OF THE INVENTION

There is provided in accordance with the invention, a radial tire comprising a pair of annular bead portions, each annular bead portion containing an annular bead core, a sidewall extending radially outwardly from each respective bead portion, and a crown portion extending between the sidewalls, said tire characterized by a carcass comprising at least two reinforced carcass layers and a tread reinforcing belt structure disposed radially outwardly of the carcass layers in the crown portion, each of said two carcass layers comprising two discontinuous plies of reinforcing cords with one of said discontinuous plies being anchored around each of said bead cores and extending through a sidewall into said crown portion to axially overlap with the tread reinforcing belt by a distance equal to at least one-fourth of the axial width of the tread reinforcing belt structure, the two discontinuous plies of each carcass layer do not overlap but have a discontinuity therebetween, and the carcass layers are arranged such that the discontinuity between the discontinuous plies of each carcass layer is axially offset from and does not overlap with the discontinuity between the discontinuous plies of every other carcass layer.

Preferably, the discontinuity between the discontinuous plies of one carcass layer is axially offset relative to the discontinuity between the discontinuous plies of every other carcass layer by a distance equal to not less than one-fourth of the axial width of the tread reinforcing belt structure.

For the purpose of this invention, the terms "radial" and "radially" refer to directions perpendicular to the axis of rotation of a tire, and the terms "axial" and "axially" refer to directions parallel to the axis of rotation of a tire.

BRIEF DESCRIPTION OF THE DRAWING

The invention will be described with reference to the sole FIGURE of the drawing which illustrates a radial cross-section through a radial carcass tire according to the invention.

DETAILED DESCRIPTION OF THE INVENTION

With reference to the accompanying drawing, there is illustrated a radial cross-section through a radial carcass tire 10. The tire 10 illustrated in the drawing is an aircraft tire, but it is believed the invention may be practiced advantageously in tires for other applications also. The tire 10 has a pair of annular bead portions 11 and 12 for engaging the bead seats and flanges of a rim (not shown). Each annular bead portion contains a substantially inextensible annular bead core 25. A sidewall 13, 14 extends radially outwardly from each respective bead portion. The two sidewalls 13,14 are interconnected by the crown portion 15 of the tire. The crown portion 15 has a ground-engaging tread portion 16 extending circumferentially thereabout.

The tire 10 has a radial carcass 17 comprising two carcass layers 18 and 19 reinforced by cords of a suitable material, preferably by cords of a low elongation material, such as an aromatic polyamide. Other possible materials for the reinforcing cords of the carcass layers are steel wire, fiberglass, and rayon. The cords in each carcass layer are parallel to each other and are oriented at an angle of between 75° and 90° with respect to the mid-circumferential plane of the tire. The radially inner carcass layer 19 comprises two discontinuous plies 23 and 24 and the radially outer carcass layer 18 comprises two discontinuous plies 21 and 22. The crown portion 15 is further reinforced by a circumferentially extending tread reinforcing belt structure 26 disposed between the radially outer carcass layer and the ground-engaging tread portion 16. Each of the discontinuous plies 21, 22, 23 and 24 is anchored around only a single bead core 25 and extends through a respective sidewall 13 or 14 into the crown portion 15 where it axially overlaps with the tread reinforcing belt a distance X/4 which is equal to not less than one-fourth of the axial width X of the tread reinforcing belt structure 26. The radially outermost ends $B_1$ and $B_2$ of the discontinuous plies 23 and 24 of the radially inner carcass layer 19 have a discontinuity therebetween that could be in the form of an abutment surface but preferably is in the form of a circumferentially extending gap 28. The radially outermost ends $A_1$ and $A_2$ of the discontinuous plies 21 and 22 of the radially outer carcass layer 18 are likewise axially spaced apart by a circumferentially extending gap 27 but could also be in abutment, as described above for $B_1$ and $B_2$. The gaps 27 and 28 between the discontinuous plies of the two carcass layers are axially offset relative to each other and do not axially overlap one another. In the preferred embodiment of the invention, the gaps between the discontinuous plies of the carcass layers are axially offset by a distance Y which is equal to not less than one-fourth of the axial width X of the tread reinforcing belt structure, and more preferably by distance which is equal to between 30 percent and 37 percent of the axial width X of the tread reinforcing belt structure. The gaps 27 and 28 between each pair of discontinuous plies can each have substantially the same axial width of up to 10 percent of the axial width X of the tread reinforcing belt structure, preferably the gaps have an axial width of no greater than 4 percent of the axial width of the tread reinforcing belt structure.

The tread portion 16 has a plurality of axially spaced apart circumferentially extending straight grooves 29 formed in its ground contacting surface. The grooves 29 are arranged such that the axial centerline C—C of any groove is axially spaced apart from the circumferentially extending gaps 27, 28 between the discontinuous plies of each carcass layer. The distance Z between the axial centerline C—C of any tread groove 29 and each said gap 27, 28 should preferably be a distance of a least 2 percent of the axial width X of the tread reinforcing belt structure, and more preferably no less than 4 percent of the axial width X of the tread reinforcing belt structure.

It is believed to be desirable to offset the gaps between the discontinuous plies not only with respect to one another, but also with respect to the tread grooves, in order to prevent the concentration of stresses as a tire passes through its footprint during use.

The tread reinforcing belt structure 26 comprises a plurality of plies of substantially parallel reinforcing cords. The reinforcing cords are most preferably a low elongation material, such as an aromatic polyamide, but could be steel wires or any other suitable material. The reinforcing cords of each ply of the tread reinforcing belt structure are parallel to one another and oriented at an angle of between 10° and 30° with respect to the mid-circumferential centerplane of the tire. The tread reinforcing belt structure 26 may be of any type suitable for use in radial tire construction, for example, a number of folded plies, a number of unfolded plies, or a combination of folded and unfolded plies.

One advantage of manufacturing a tire with a carcass comprising two carcass layers of discontinuous plies is that during tire building the tolerance on the placement of the bead cores is looser than for tires having carcass layers comprising cords which extend continuously from one bead portion of the tire to another bead portion of the tire. This advantage is particularly important when building tires having carcass layers reinforced by low elongation materials like aromatic polyamide fibers and steel cords.

Furthermore, with a low elongation material, such as an aromatic polyamide, the carcass cords are not subject to excessive strains during the service life of the tire, because the elastomeric material in the gaps between the radially outer ends of the discontinuous plies dissipates the strain in the discontinuous plies.

While the present invention has been described with reference to the embodiment illustrated in the drawing, it is understood that further modifications may be made within the scope and spirit of the invention.

I claim:

1. A radial aircraft tire having a pair of annular bead portions, each annular bead portion containing an annular bead core, a sidewall extending radially outwardly from each bead portion, and a crown portion extending between the sidewalls with a ground-engaging tread portion extending circumferentially thereabout, said tread portion having axially spaced apart circumferentially extending straight grooves therein, said tire further comprising a carcass consisting of two reinforced radial carcass layers and a tread reinforcing belt structure disposed radially outwardly of the carcass layers in said crown portion, each of said carcass layers comprising two discontinuous plies of radial reinforcing cords with one of said discontinuous plies being anchored around each of said cores and extending through a sidewall into said crown portion in overlapping relationship with the tread reinforcing belt structure by a distance equal to at least one-fourth of the axial width of the tread-reinforcing belt structure, the two discontinuous plies of each carcass layer have an axial gap with an axial width of no greater than 10 percent of the axial width of said tread reinforcing belt structure therebetween, the carcass layers being arranged such that the axial gap between the discontinuous plies of each layer is axially offset from and does not overlap with the axial gap between the discontinuous plies of the other carcass layer, and the axial gaps between the discontinuous plies of each carcass layer being axially spaced apart from the grooves in said tread portion by a distance equal to at least 3 percent of the axial width of said tread reinforcing belt structure.

2. A radial tire as claimed in claim 1 wherein the axial gap between the discontinuous plies of one carcass layer is axially offset relative to the axial gap between the discontinuous plies of every other carcass layer by a distance equal to not less than one-fourth of the axial width of the tread reinforcing belt structure.

3. A radial tire as claimed in claim 1 wherein the axial gap between the discontinuous plies of one carcass layer is axially offset relative to the axial gap between the discontinuous plies of every other carcass layer by a distance of between 30 percent and 37 percent of the axial width of the tread reinforcing belt structure.

4. A radial tire as claimed in any one of claims 1, 2 or 3 wherein the axial gaps between the discontinuous plies of the carcass layers have the same axial width, the axial widths of said gaps being no greater than 4 percent of the axial width of the tread reinforcing belt structure.

5. A radial tire as claimed in any one of claims 1, 2 or 3 further comprising a ground-engaging tread portion extending circumferentially about said crown portion, said tread portion having axially spaced apart circumferentially extending straight grooves therein, the axial gaps between the discontinuous plies of the carcass layers being axially spaced apart from the grooves in said tread portion.

6. A radial tire as claimed in any one of claims 1, 2 or 3 further comprising a ground-engaging tread portion extending circumferentially about said crown portion, said tread portion having axially spaced apart circumferentially extending straight grooves therein, the axial gaps between the discontinuous plies of the carcass layers being axially spaced apart from the grooves in said tread portion by a distance equal to at least 3 percent of the axial width of said tread reinforcing belt structure.

7. A radial tire as claimed in any one of claims 1, 2 or 3 wherein the reinforcing cords of said discontinuous plies comprise an aromatic polyamide.

* * * * *